(12) United States Patent
Hawkinson

(10) Patent No.: US 10,602,841 B2
(45) Date of Patent: Mar. 31, 2020

(54) VIDEO SCREEN HOLDING ASSEMBLY

(71) Applicant: Todd Hawkinson, Sioux City, IA (US)

(72) Inventor: Todd Hawkinson, Sioux City, IA (US)

( * ) Notice: Subject to any disclaimer, the term of this patent is extended or adjusted under 35 U.S.C. 154(b) by 22 days.

(21) Appl. No.: 15/946,553

(22) Filed: Apr. 5, 2018

(65) Prior Publication Data
US 2019/0307245 A1 Oct. 10, 2019

(51) Int. Cl.
*A47B 97/04* (2006.01)
*A47B 23/00* (2006.01)
*F16M 11/38* (2006.01)

(52) U.S. Cl.
CPC ............ *A47B 23/00* (2013.01); *F16M 11/38* (2013.01)

(58) Field of Classification Search
CPC ................................ A47B 23/00; F16M 11/28
USPC .... 248/447, 441.1, 121, 371, 158, 127, 917, 248/919; 455/575.1; 379/454, 455; 348/825
See application file for complete search history.

(56) References Cited

U.S. PATENT DOCUMENTS

| | | | |
|---|---|---|---|
| 7,712,719 B2 | 5/2010 | Derry et al. | |
| 8,550,421 B2 | 10/2013 | Liu | |
| 8,608,123 B2 | 12/2013 | Takahashi | |
| 8,763,346 B2 * | 7/2014 | Kuster | H01L 31/18 52/747.1 |
| 9,010,822 B2 | 4/2015 | Rasmussen | |
| 9,249,995 B2 * | 2/2016 | Krantz | H02S 20/30 |
| D755,796 S | 5/2016 | Gibson | |
| 9,353,904 B2 | 5/2016 | Sun | |
| 2012/0074270 A1 * | 3/2012 | Pays | G10D 1/005 248/121 |
| 2013/0026329 A1 | 1/2013 | Lane et al. | |
| 2015/0048233 A1 | 2/2015 | Dumas | |

* cited by examiner

Primary Examiner — Todd M Epps

(57) ABSTRACT

A video screen holding assembly for holding an electronic device in a landscape position or a portrait position includes a frame and a plurality of holding units. Each of the holding units is pivotally coupled to and extends outwardly from the frame and the holding units are spaced from each other and distributed horizontally along the frame. Each of the holding units has a deployed position and a stored position and each of the holding units holds an electronic device when in the deployed position. A plurality of first couplers is provided and each of the first couplers pivotally couples a respective one of the holding units to the frame. A plurality of second couplers is provided and each of the second couplers pivotally couples a respective one of the holding units to the frame.

11 Claims, 4 Drawing Sheets

VIDEO SCREEN HOLDING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to holding devices and more particularly pertains to a new holding device for holding an electronic device in a landscape position or a portrait position.

BRIEF SUMMARY OF THE INVENTION

An embodiment of the disclosure meets the needs presented above by generally comprising a frame and a plurality of holding units. Each of the holding units is pivotally coupled to and extends outwardly from the frame and the holding units are spaced from each other and distributed horizontally along the frame. Each of the holding units has a deployed position and a stored position and each of the holding units holds an electronic device when in the deployed position. A plurality of first couplers is provided and each of the first couplers pivotally couples a respective one of the holding units to the frame. A plurality of second couplers is provided and each of the second couplers pivotally couples a respective one of the holding units to the frame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
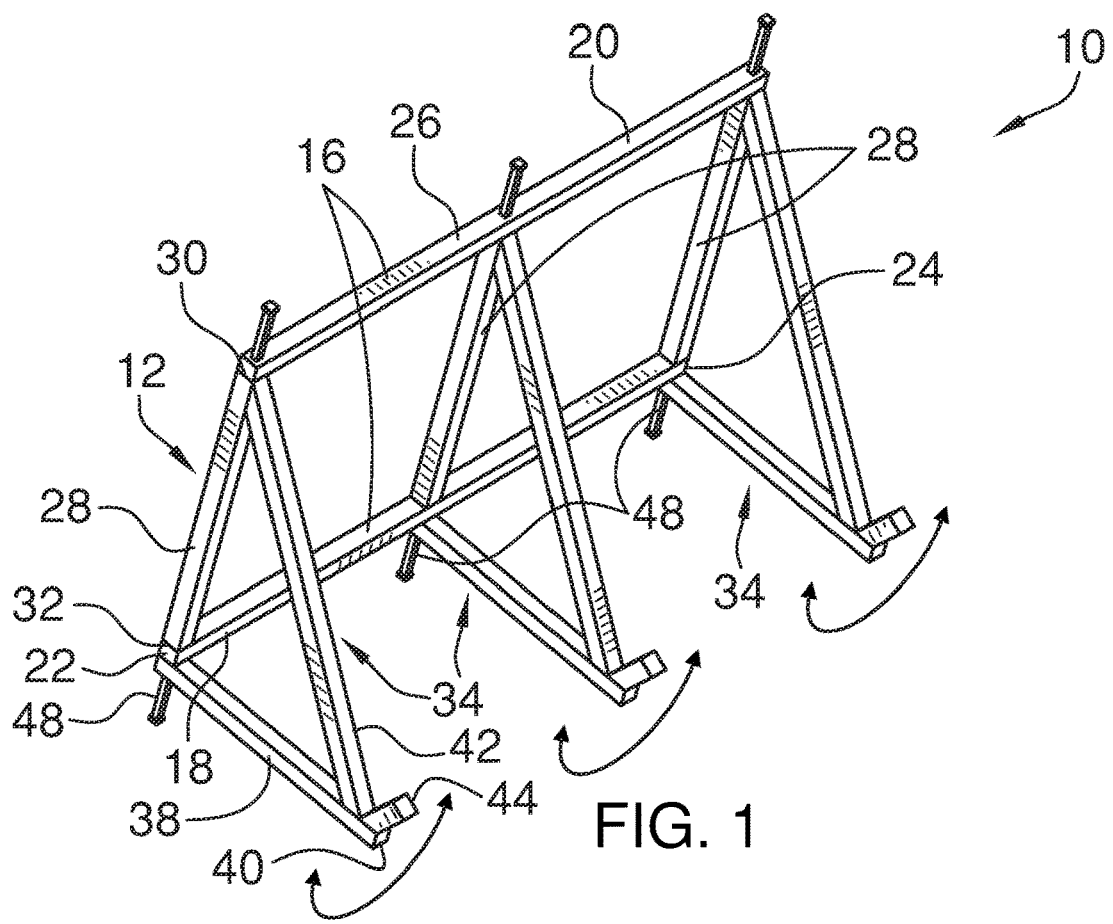
FIG. 1 is a front perspective view of a video screen holding assembly according to an embodiment of the disclosure.
Figure 2:
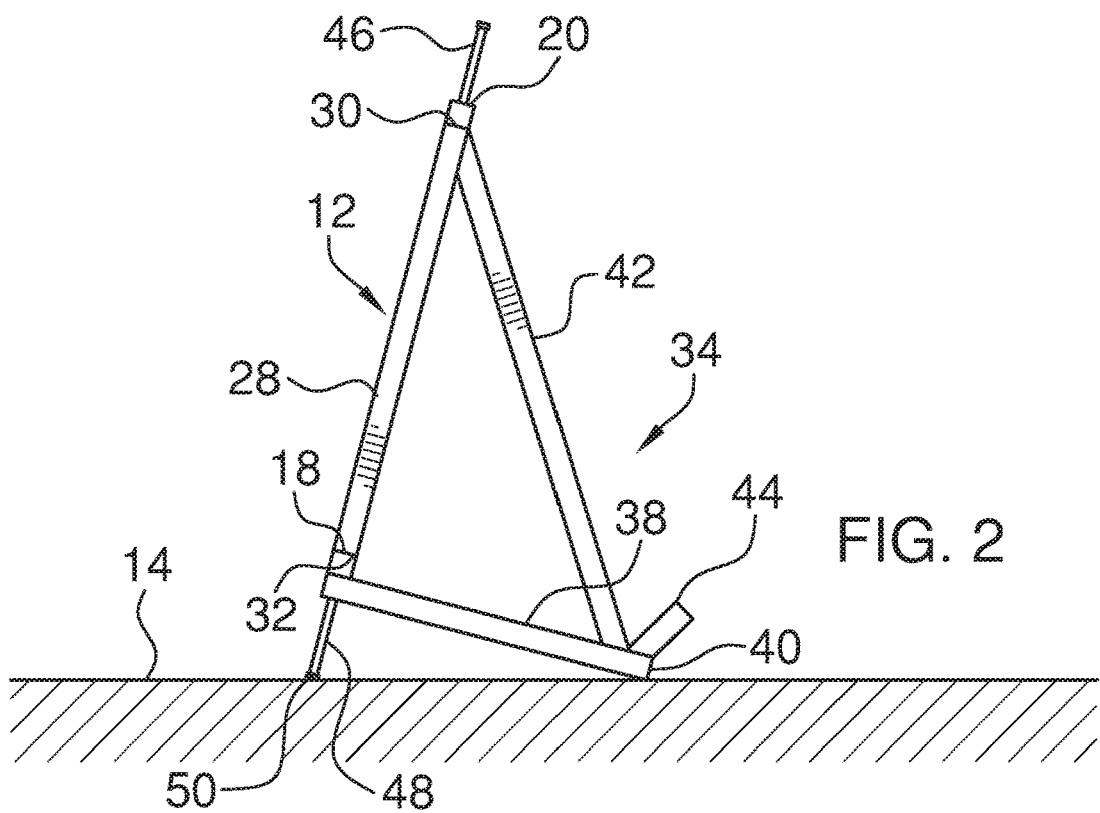
FIG. 2 is a right side in use-view of an embodiment of the disclosure.
Figure 3:
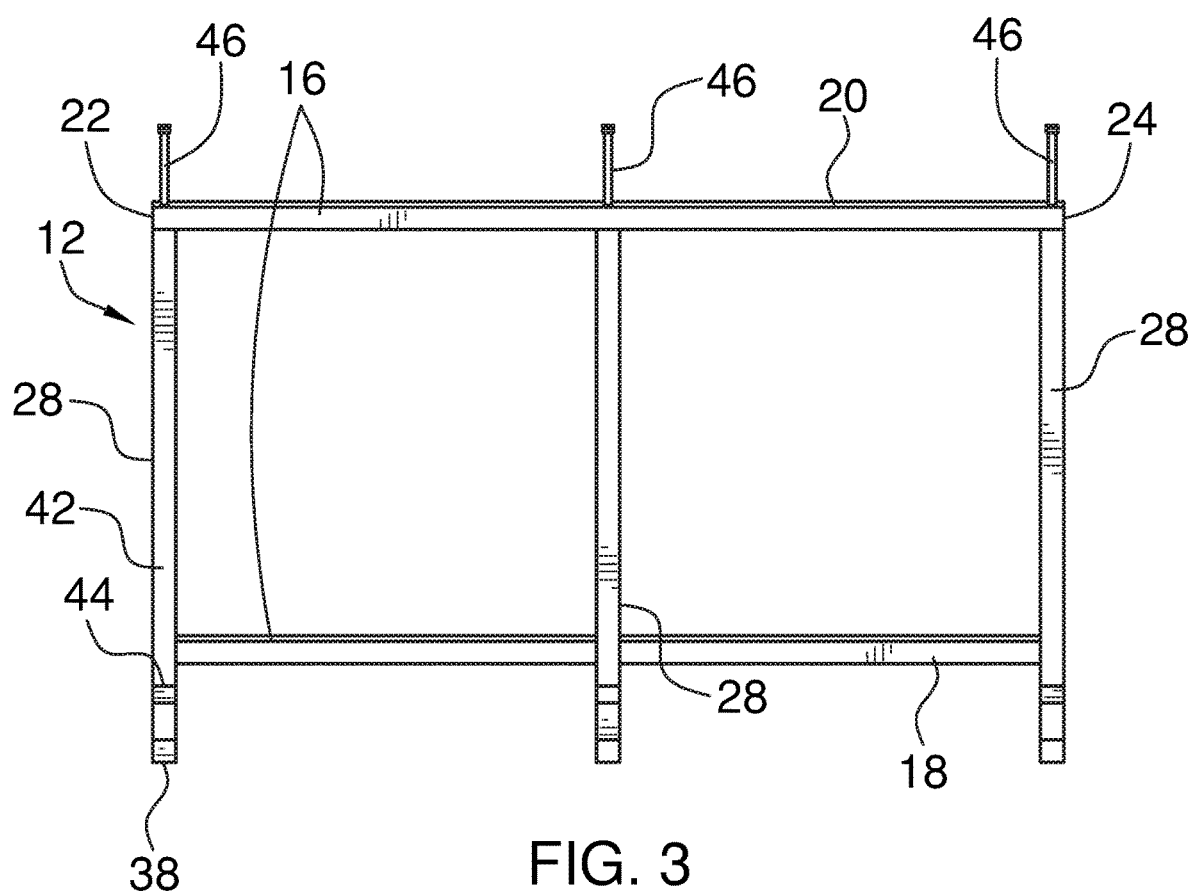
FIG. 3 is a front view of an embodiment of the disclosure.
Figure 4:
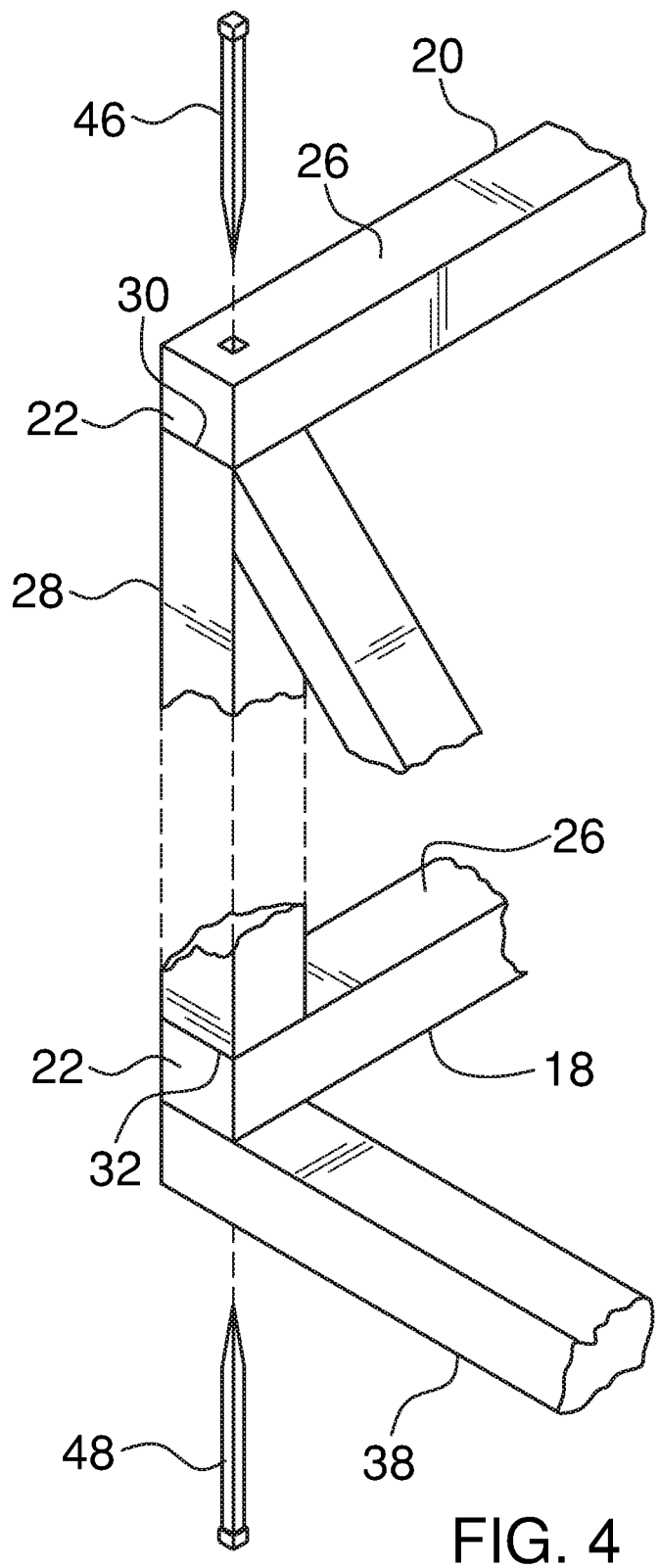
FIG. 4 is an exploded perspective view of an embodiment of the disclosure.
Figure 5:
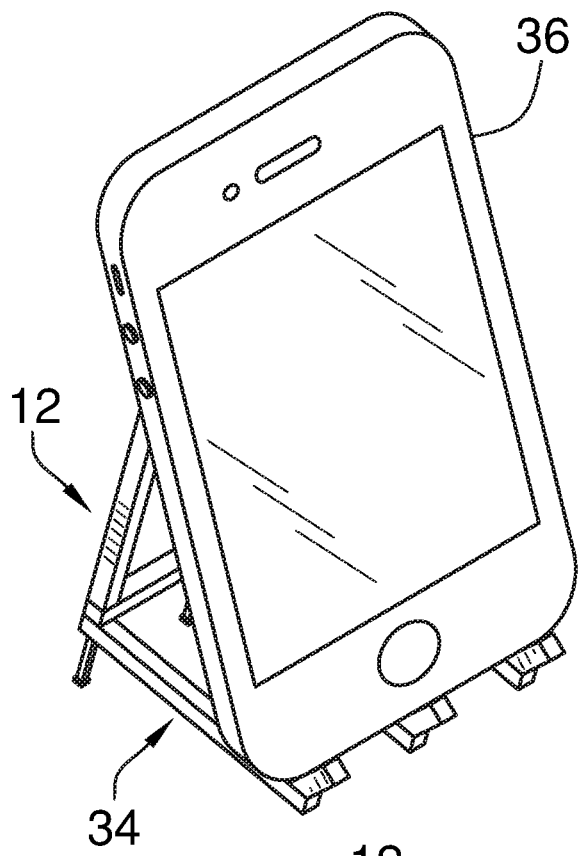
FIG. 5 is a perspective in use view of an embodiment of the disclosure showing an electronic device in a portrait position.
Figure 6:
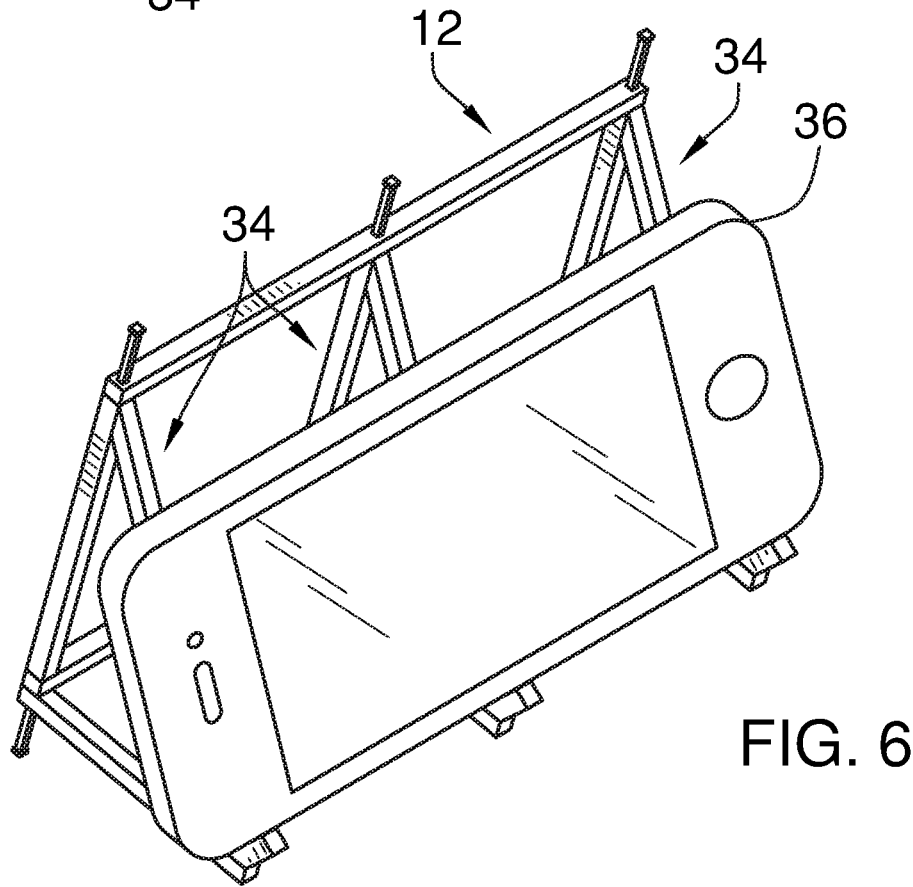
FIG. 6 is a perspective in-use view of an embodiment of the disclosure showing an electronic device in a landscape position.

With reference now to the drawings, and in particular to FIGS. 1 through 6 thereof, a new holding device embodying the principles and concepts of an embodiment of the disclosure and generally designated by the reference numeral 10 will be described.

As best illustrated in FIGS. 1 through 6, the video screen holding assembly 10 generally comprises a frame 12 that is positionable on a support surface 14, such as a table or other horizontal support surface 14. The frame 12 includes a pair of horizontal supports 16 that is each horizontally oriented and the pair of horizontal supports 16 includes a first horizontal support 18 and a second horizontal support 20. The second horizontal support 20 is spaced upwardly from the first horizontal support 18. Each of the first horizontal support 18 and the second horizontal support 20 has a first end 22, a second end 24 and a peripheral wall 26 that extends between the first end 22 and the second end 24. Moreover, each of the first horizontal support 18 and the second horizontal support 20 is elongated between the first end 22 and the second end 24.

The frame 12 further includes a plurality of vertical supports 28 that is each vertically oriented. Each of the vertical supports 28 is rotatably coupled to and extends between the first 18 and the second 20 horizontal supports. Each of the vertical supports 28 has a top end 30 and a bottom end 32, and the bottom end 32 of each of the vertical support is rotatably coupled to the peripheral wall 26 of the first horizontal support 18. The top end 30 of each of the vertical supports 28 is rotatably coupled to the peripheral wall 26 of the second horizontal support 20. Thus, each of the vertical supports 28 is rotatable around an axis that extends through the top end 30 and the bottom end 32.

A plurality of holding units 34 is provided and each of the holding units 34 is pivotally coupled to and extends outwardly from the frame 12. The holding units 34 are spaced from each other and are distributed horizontally along the frame 12. Each of the holding units 34 has a deployed position and a stored position, and each of the holding units 34 may hold an electronic device 36 when in the deployed position. The electronic device 36 may be a smart phone, a tablet personal computer and any other electronic device 36 that has a video screen. Additionally, the electronic device 36 may be oriented in a landscape orientation or a portrait orientation.

Each of the holding units 34 comprises an extension rod 38 that is attached to the first horizontal support 18 and extends outwardly therefrom. The extension rod 38 is perpendicular relative to the first horizontal support 18 and the extension rod 38 has a distal end 40 with respect to the first horizontal support 18. Each of the holding units 34 includes a holding rod 42 that is attached to a respective one of the vertical supports 28 and extends toward the distal end 40 of the extension rod 38. The holding rod 42 is attached to the extension rod 38 adjacent to the distal end 40 of the extension rod 38 and the holding rod 42 forms an acute angle with the extension rod 38 and the respective vertical support 28. Moreover, the holding rod 42 pivots laterally when the respective vertical support 28 rotates. A foot 44 is attached to and extends outwardly adjacent to the distal end 40 of the extension rod 38. The foot 44 forms an acute angle with the holding rod 42 and the foot 44 retains the electronic device 36 thereon when the electronic device 36 is positioned on the holding rod 42.

A plurality of first couplers 46 is provided and each of the first couplers 46 pivotally couples a respective one of the holding units 34 to the frame 12. Each of the first couplers 46 is associated with one of the vertical supports 28. Each of the first couplers 46 extends through the second horizontal support 20 and into the associated vertical support 28 to pivotally couple the associated vertical support 28 to the second horizontal support 20. Each of the first couplers 46 may comprise a pin or the like that pivotally extends through the respective holding unit 34 and the frame 12.

A plurality of second couplers 48 is provided and each of the second couplers 48 pivotally couples a respective one of the holding units 34 to the frame 12. Each of the second couplers 48 extends through a respective one of the holding rods 42, through the first horizontal support 18 and into a respective one of the vertical supports 28. In this way the extension rod 38 and the respective vertical support 28 are pivotally coupled to the first horizontal support 18 wherein each of the holding units 34 is laterally pivotable on the frame 12. Each of the second couplers 48 has a distal end 50 with respect to the respective holding rod 42 and the distal end 50 of each of the second couplers 48 abuts the support surface 14 when the frame 12 is positioned on the support surface 14. Thus, the first horizontal support 18 is spaced from the support surface 14 to facilitate a charge cord for charging the electronic device 36 to pass beneath the frame 12.

In use, each of the holding units 34 is positioned in the deployed position and the frame 12 is positioned on the support surface 14. Each of the second couplers 48 abuts the support surface 14 and the distal end 40 of the extension rod 38 of each holding unit 34 abuts the support surface 14. The electronic device 36 is positioned on the extension rod 38 of each holding unit 34 and rests on the foot 44 of each holding unit 34. In this way the electronic device 36 is retained at an angle with respect to the support surface 14 thereby facilitating the video screen to be viewed by a user. Each of the holding units 34 is positioned in the stored position when the frame 12 and holding units 34 are being stored. Additionally, each of the first 46 and second 48 couplers may be removed from the frame 12 to disassemble the holding units 34 from the frame 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A video screen holding assembly configured to hold an electronic device for viewing, said assembly comprising:
   a frame;
   a plurality of holding units, each of said holding units being pivotally coupled to and extending outwardly from said frame, each of said holding units being spaced from each other horizontally along said frame, each of said holding units having a deployed position and a stored position, each of said holding units being configured to hold an electronic device when in said deployed position;
   a plurality of first couplers, each of said first couplers being pivotally coupled to a respective one of said holding units and said frame; and
   a plurality of second couplers, each of said second couplers being pivotally coupled to a respective one of said holding units and said frame.

2. The assembly according to claim 1, wherein said frame comprises a pair of horizontal supports including a first horizontal support and a second horizontal support, said second horizontal support being spaced upwardly from said first horizontal support, each of said first horizontal support and said second horizontal support having a first end, a second end and a peripheral wall that extends between said first end and said second end, each of said first horizontal support and said second horizontal support being elongated between said first end and said second end.

3. The assembly according to claim 2, wherein said frame further comprises a plurality of vertical supports, each of said vertical supports being rotatably coupled to and extending between said first and said second horizontal supports, each of said vertical support having a top end and a bottom end.

4. The assembly according to claim 3, wherein said bottom end of each of said vertical support is rotatably coupled to said peripheral wall of said first horizontal support, said top end of each of said vertical supports being rotatably coupled to said peripheral wall of said second horizontal support, each of said vertical support being rotatable around an axis that extends through said top end and said bottom end.

5. The assembly according to claim 4, wherein each of said first couplers is associated with one of said vertical supports, each of said first couplers extending through said second horizontal support and into said associated one of said vertical supports to pivotally couple said vertical support to said second horizontal support.

6. The assembly according to claim 4, wherein each of said second couplers extends through a respective one of said holding rods, through said first horizontal support and into a respective one of said vertical supports to pivotally couple said extension rod and said respective vertical support to said first horizontal support wherein each of said holding units is laterally pivotable on said frame.

7. The assembly according to claim 6, wherein each of said second couplers has a distal end with respect to said respective holding rod wherein said distal end of each of said second couplers abuts a support surface thereby elevating said first horizontal support from the support surface wherein first horizontal support is configured to have a charge cord pass therebeneath.

8. The assembly according to claim 3, wherein each of said holding units comprises an extension rod being attached to said first horizontal support and extending outwardly therefrom, said extension rod being perpendicular relative to said horizontal support, said extension rod having a distal end with respect to said first horizontal support.

9. The assembly according to claim 8, further comprising a holding rod being attached to said vertical support and extending toward said distal end of said extension rod, said holding rod being attached to said extension rod adjacent to said distal end, said holding rod being positioned to form an acute angle with said extension rod and said vertical support, wherein said holding rod pivots when said vertical support rotates.

10. The assembly according to claim 9, further comprising a foot being attached to and extending outwardly adjacent to said distal end of said extension rod, said foot being positioned to form an acute angle with said holding rod, said foot being configured to retain an electronic device thereon when the electronic device is positioned on said holding rod.

11. A video screen holding assembly configured to hold an electronic device for viewing, said assembly comprising:
 a frame comprising:
  a pair of horizontal supports each being horizontally oriented, said pair of horizontal supports including a first horizontal support and a second horizontal support, said second horizontal support being spaced upwardly from said first horizontal support, each of said first horizontal support and said second horizontal support having a first end, a second end and a peripheral wall that extends between said first end and said second end, each of said first horizontal support and said second horizontal support being elongated between said first end and said second end;
  a plurality of vertical supports each being vertically oriented, each of said vertical supports being rotatably coupled to and extending between said first and said second horizontal supports, each of said vertical support having a top end and a bottom end, said bottom end of each of said vertical support being rotatably coupled to said peripheral wall of said first horizontal support, said top end of each of said vertical supports being rotatably coupled to said peripheral wall of said second horizontal support, each of said vertical support being rotatable around an axis that extends through said top end and said bottom end;
 a plurality of holding units, each of said holding units being pivotally coupled to and extending outwardly from said frame, each of said holding units being spaced from each other horizontally along said frame, each of said holding units having a deployed position and a stored position, each of said holding units being configured to hold an electronic device when in said deployed position, each of said holding units comprising:
  an extension rod being attached to said first horizontal support and extending outwardly therefrom, said extension rod being perpendicular relative to said horizontal support, said extension rod having a distal end with respect to said first horizontal support;
  a holding rod being attached to said vertical support and extending toward said distal end of said extension rod, said holding rod being attached to said extension rod adjacent to said distal end, said holding rod being positioned to form an acute angle with said extension rod and said vertical support, wherein said holding rod pivots when said vertical support rotates;
  a foot being attached to and extending outwardly adjacent to said distal end of said extension rod, said foot being positioned to form an acute angle with said holding rod, said foot being configured to retain an electronic device thereon when the electronic device is positioned on said holding rod;
 a plurality of first couplers, each of said first couplers being pivotally coupled to a respective one of said holding units and said frame, each of said first couplers being associated with one of said vertical supports, each of said first couplers extending through said second horizontal support and into said associated one of said vertical supports to pivotally couple said vertical support to said second horizontal support; and
 a plurality of second couplers, each of said second couplers being pivotally coupled to a respective one of said holding units and said frame, each of said second couplers extending through a respective one of said holding rods, through said first horizontal support and into a respective one of said vertical supports to pivotally couple said extension rod and said respective vertical support to said first horizontal support wherein each of said holding units is laterally pivotable on said frame, each of said second couplers having a distal end with respect to said respective holding rod wherein said distal end of each of said second couplers abuts a support surface thereby elevating said first horizontal support from the support surface wherein first horizontal support is configured to have a charge cord pass therebeneath.

* * * * *